(12) United States Patent
Brice

(10) Patent No.: US 8,261,961 B2
(45) Date of Patent: Sep. 11, 2012

(54) METAL MATRIX CARBON NANOTUBE COMPOSITE MATERIAL AND METHOD OF MAKING SAME

(75) Inventor: Craig A. Brice, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1006 days.

(21) Appl. No.: 12/100,826

(22) Filed: Apr. 10, 2008

(65) Prior Publication Data

US 2009/0258232 A1     Oct. 15, 2009

(51) Int. Cl.
*B23K 20/00* (2006.01)
*B23K 20/12* (2006.01)

(52) U.S. Cl. ............ 228/112.1; 228/113; 228/114; 228/2.1

(58) Field of Classification Search ............ 228/112.1, 228/113, 114, 2.1
See application file for complete search history.

(56) References Cited

U.S. PATENT DOCUMENTS

| | | | |
|---|---|---|---|
| 5,460,317 | A | 10/1995 | Thomas et al. |
| 5,813,592 | A | 9/1998 | Midling et al. |
| 5,971,247 | A | 10/1999 | Gentry |
| 5,971,252 | A | 10/1999 | Rosen et al. |
| 6,582,539 | B2 | 6/2003 | Iwanczyk et al. |
| 2003/0157333 | A1* | 8/2003 | Ren et al. .......... 428/408 |
| 2006/0208032 | A1 | 9/2006 | Jones et al. |
| 2006/0233692 | A1* | 10/2006 | Scaringe et al. ...... 423/335 |
| 2008/0099534 | A1* | 5/2008 | Brice et al. .......... 228/112.1 |

* cited by examiner

*Primary Examiner* — Kiley Stoner
*Assistant Examiner* — Erin Saad
(74) *Attorney, Agent, or Firm* — Bracewell & Giuliani LLP

(57) ABSTRACT

A solid state method for the preparation of composite materials incorporating metal and nano materials is provided, wherein nano materials are deposited on a substrate and incorporated into the substrate structure by friction stir welding. Also provided are composite materials that include nano materials, which are prepared by friction stir welding.

17 Claims, 1 Drawing Sheet

METAL MATRIX CARBON NANOTUBE COMPOSITE MATERIAL AND METHOD OF MAKING SAME

BACKGROUND OF THE INVENTION

1. Field of the Invention

The present invention relates generally to a method for the production of composite materials. Specifically, the invention relates to the production of a composite aluminum material that includes carbon nanotubes.

2. Description of Related Art

Friction stir welding is a solid state joining process developed in the early 1990s, that utilizes a high strength rotating pin tool to create frictional heat which induces plastic flow to create a bond between two metallic surfaces. This process is primarily used on aluminum, and most often on large pieces which cannot be easily heat treated after welding to recover temper characteristics. The friction stir welding process may be used with other materials as well, such as for example, other metals and plastics.

Methods for creating large composite structures have been previously described employing friction stir welding to join large work pieces, such as for example, as described in U.S. Pat. No. 6,582,539. In these methods, composite panels, such as a carbon-fiber-reinforced resin panels, are adhesively fixed to metal pieces, which are then joined using friction stir welding.

However, until the present invention, methods for the solid state preparation of composite materials having integrated nanomaterials have not been reported.

SUMMARY OF THE INVENTION

Methods are provided herein for making composite materials that include carbon nanotubes and aluminum or aluminum alloys. Also provided are compositions that include carbon nanotubes and aluminum or aluminum alloys.

In one aspect, a method for the production of composite materials using friction stir welding is described. The method includes the steps of providing a layered structure, wherein the layered structure includes a plurality of metal layers having a layer of carbon nanotubes deposited on the surface of the metal layer. The plurality of carbon nanotubes and metal layers of the layered structure are mixed with a friction stir welding tool to produce a composite structure having carbon nanotubes integrated therein.

In certain embodiments, the step of mixing includes entering the layered structure with a probe of high strength, wear resistant material, and rotating the probe to generate a frictional heat. The frictional heat creates a zone of high strain-rate plastic flow, and the rotation of the probe causes flow and intermixing of the metal and carbon nanotubes about the probe. The frictional heat generated by the rotating probe is maintained below the melting point of the metal and below the decomposition temperature of the carbon nanotubes.

In another aspect, a method for the preparation of an aluminum-carbon nanotube composite structure is provided. The method includes the steps of providing a plurality of aluminum substrates, said substrates having a thickness of less than 0.01 inches and depositing a carbon nanotube layer on each aluminum substrate. The carbon nanotube layer is applied to the aluminum substrate as a solution and the solvent is removed from the surface of the aluminum substrate via evaporation. A plurality of aluminum substrates having the carbon nanotubes deposited thereon are combined to produce a layered structure having alternating layers of aluminum and carbon nanotubes. The alternating layers of the layered structure are mixed to produce a composite material, wherein the composite material includes integrally mixed aluminum and carbon nanotubes.

In certain embodiments, the substrate is an aluminum alloy. In certain embodiments, the aluminum or aluminum alloy substrate has a thickness of between 0.002 and 0.005. In certain embodiments, the composite structure comprises between 5 and 15% carbon nanotubes by volume. In certain embodiments, the composite structure comprises between 15 and 25% carbon nanotubes by volume. In certain embodiments, the composite structure comprises up to 30% carbon nanotubes by volume. In certain embodiments, the composite structure comprises between 0.5 and 5% carbon nanotubes by volume.

In another aspect, an aluminum-carbon nanotube composite is provided. The composite includes an integrated mixture of aluminum and carbon nanotubes, wherein the composite includes up to 30% by volume carbon nanotubes. The integrated mixture of the aluminum and carbon nanotubes is prepared with a friction stir welding device. The friction stir welding device includes a wear resistant pin which is rotated across and through a layered structure having alternating layers of aluminum and carbon nanotubes.

In certain embodiments, the composite structure comprises between 1 and 15% carbon nanotubes by volume. In certain embodiments, the composite structure comprises between 15 and 25% carbon nanotubes by volume. In certain embodiments, the composite structure comprises between 0.5 and 5% carbon nanotubes by volume.

DETAILED DESCRIPTION

Figure 1:
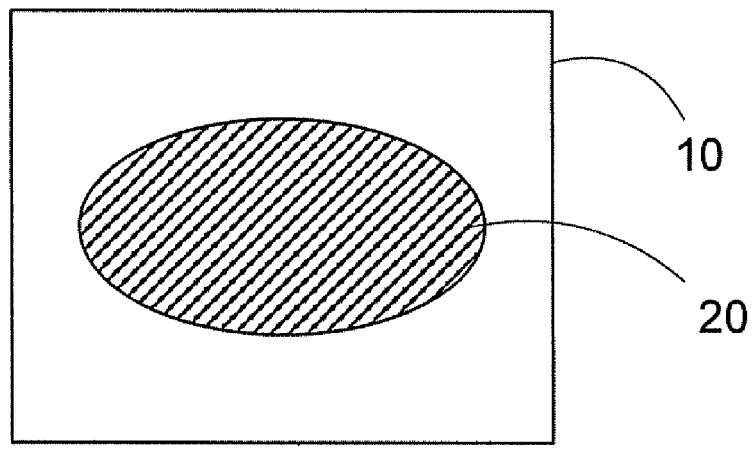
FIG. 1 is a schematic of a layer of carbon nanotubes on an aluminum foil substrate.

Although the following detailed description contains many specific details for purposes of illustration, one of ordinary skill in the art will appreciate that many variations and alterations to the following details are within the scope and spirit of the invention. Accordingly, the exemplary embodiments of the invention described herein are set forth without any loss of generality to, and without imposing limitations thereon, the present invention.

In one aspect, the present invention is directed to solid state methods for the preparation of composite materials, particularly solid state methods for the preparation of composite materials that include nano-sized particles and materials, including carbon nanotubes. Composite materials are engineered materials made from two or more constituent materials, wherein the constituent materials have significantly different physical or chemical properties which remain separate and distinct on a macroscopic level within a finished structure.

As used herein, the term "nanomaterial" includes, but is not limited to, multi-wall carbon or boron nitride nanotubes, single-wall carbon or boron nitride nanotubes, carbon or boron nitride nanoparticles, carbon or boron nitride nanofibers, carbon or boron nitride nanoropes, carbon or boron nitride nanoribbons, carbon or boron nitride nanofibrils, carbon or boron nitride nanoneedles, carbon or boron nitride nanosheets, carbon or boron nitride nanorods, carbon or boron nitride nanohorns, carbon or boron nitride nanocones, carbon or boron nitride nanoscrolls, graphite nanoplatelets, graphite nanoparticles, nanodots, other fullerene materials, or a combination thereof. As used herein, "multi-wall" includes double-wall nanotubes (DWNTs) and few-wall nanotubes (FWNTs).

As used herein, the term "nanotubes" is used broadly, unless otherwise explicitly qualified, is intended to encompass any type of nanomaterial. Generally, as used herein, a "nanotube" is a tubular, strand-like structure that has a circumference on the atomic scale. For example, the diameter of single-wall nanotubes can typically range from approximately 0.4 nm to approximately 100 nm. Typically, single-wall nanotubes have diameters ranging from approximately 0.7 nm to approximately 5 nm, and lengths of up to several thousand times nanometers.

While the term "SWNT" as used herein, refers to single-wall nanotubes, it is understood that other nanomaterials may be substituted unless otherwise stated herein.

Carbon nanotubes are among the strongest materials known in terms of tensile strength and elastic modulus. Additionally, due to a relatively low density for a solid, the specific strength of the materials is particularly high. For example, the specific strength of carbon nanotubes can be up to approximately 48,000 kN-m/kg, whereas the specific strength of steel is approximately 154 kN-m/kg. In terms of the electrical properties, depending upon the specific structure, carbon nanotubes behave as either a metal or as a semiconductor. Additionally, carbon nanotubes are believed to be good thermal conductors, and can have thermal properties which are comparable or better than metal compounds.

Single-wall nanotubes suitable for use in the present invention can be produced by a high pressure carbon monoxide process (HiPco), arc discharge, laser vaporization, chemical vapor deposition or other methods known to one of skill in the art. Nanotubes made by the HiPco process can be purchased from Carbon Nanotechnologies, Inc. (Houston, Tex.).

Boron nitride nanotubes may also be used in accordance to the present invention. Methods for the manufacture of boron nitride nanotubes are known to those of ordinary skill in the art. (See e.g., Han et al., Applied Physics Letters, 73 (1998) 3085-87; Chen et al., Materials Science Forum, vol. 312-314 (1999) 173-78; Chen et al., Materials Science Forum, vol. 343-46 (2000) 63-67; and Chen et al., Journal of Metastable and Nanocrystalline Materials, 8 (1999) 63-67). Boron nitride nanotubes have gained attention for aerospace applications in an effort to improve the radiation shielding properties, in part due to the presence of the light isotope of boron ($^{10}$B) and the isotope's neutron absorption properties. Additionally, boron nitride fibers are currently used as reinforcement of composite materials.

The various properties of carbon and boron nanotubes make these materials desirable additives for composite materials. Specifically, composite materials that include carbon and boron nanotubes demonstrate a variety of benefits, including increased strength, improved thermal and electrical conductivity, improved damage tolerance, lower density and reduced weight. In certain applications, the improvement in thermal conductivity can provide a conductive path for heat to a heat sink, allowing for the elimination of a passive heat exchanger. Similarly, the improved strength and reduced weight is beneficial in a wide variety of applications, including but not limited to the automotive and aerospace industries.

Traditional techniques for the preparation of aluminum composite materials that include carbon nanotubes results in either layered structures having discrete aluminum layers and discrete nanotube layers, or it requires the use of high temperatures. When high temperatures are used, carbon nanotubes are mixed with aluminum in the liquid state. This can result in the formation of carbon nanotube aggregates and aluminum-carbon complexes.

In one example of use of the present invention, layered structures are prepared by combining multiple metal layers having carbon nanotubes or other nano-materials deposited thereon and using a friction stir welding tool to mix the metal layer and carbon nanotubes. This produces a metal composite material having carbon nanotubes or other nano-materials integrally dispersed in the composite.

Typically, friction stir welding is used to join two work pieces together. In friction stir welding, a cylindrical-shouldered tool, having a profiled threaded/unthreaded probe (pin or nib) is rotated at a constant speed and fed at a constant traverse rate into the joint line between two pieces of sheet or plate material, which are butted together. The parts have to be clamped rigidly onto a backing bar in a manner that prevents the abutting joint faces from being forced apart. Typically, the length of the nib is slightly less than the weld depth required and the tool shoulder is preferably in intimate contact with the work surface. The nib is then moved against the work, or vice-versa.

Frictional heat is generated between the wear resistant welding tool shoulder and pin, and the material of the workpieces. This heat, along with the heat generated by the mechanical mixing process and the adiabatic heat within the material, cause the stirred materials to soften without reaching their melting point. Hence, friction stir welding is cited as a solid-state process. This allows the tool to traverse along the weld line in a plasticized tubular shaft of metal. As the pin is moved in the direction of welding the leading face of the pin, assisted by a special pin profile, plasticized material is forced from the front of the pin to the back of the pin, while at the same time applying a substantial forging force to consolidate the weld metal. The welding of the material can be facilitated by severe plastic deformation in the solid state involving dynamic recrystallization of the base material.

Relative to traditional welding techniques, the friction stir welding tool has multiple advantages, including good mechanical properties of the welded material, the absence of toxic fumes, no filler material is required, the process is readily automated, and because there is no weld pool, the tool can operate in all positions (horizontal, vertical, etc).

In one embodiment of the present invention, a layered structure is prepared by stacking a plurality of individual metal layers having carbon nanotubes deposited thereon. The substrate layer can take a variety of forms depending on the desired volume fraction of carbon nanotubes to substrate material. Generally, the thickness of the substrate is greater than about 0.001 inches. For example, metal sheets or foil can be used as the substrate that have a thickness between about 0.001 and about 0.05 inches. In certain preferred embodiments, the thickness of the substrate layer is between about 0.002 and about 0.01 inches thick. In certain embodiments, the layers of the substrate can have multiple thicknesses. In certain embodiments, the carbon nanotube layers can have multiple differing thicknesses. In certain other embodiments, the thickness of each carbon nanotube layer can be proportional to the thickness of the metal substrate layer on which it is deposited. Typically, the sheets are prepared by cutting to the desired dimension, cleaning the surface by known means, such as for example, with an organic solvent. The substrate can be rinsed with deionized water or the like to remove remaining residue and treated to remove the any moisture present. Exemplary methods for the removal of moisture include, but are not limited to, heating the substrate, in an environment of reduced pressure, or upon exposing the substrate to an inert gas stream.

FIG. 1 shows an example of the preparation of one layer of a composite substrate wherein an aliquot of a carbon nanotubes solution 20 is deposited on the surface of a substrate 10. The solvent is allowed to evaporate, either naturally, or with the addition of either heat and/or a reduced pressure environment in order to accelerate the evaporation process, thereby depositing a carbon nanotube layer 20 on the surface of the substrate 10. In certain embodiments, an inert gas stream can be applied to assist in the removal of the solvent.

The amount of carbon nanotubes that can be applied to the substrate surface varies based upon the solubility of the carbon nanotubes and desired properties of the end product composite. In certain embodiments, up to 30% by volume of carbon nanotubes can be applied to the surface of the substrate. In certain embodiments, between approximately 0.5 and 5% by volume of the carbon nanotubes can be incorporated. In certain other embodiments between 5% and 25% by volume of the carbon nanotubes can be applied to the surface of the substrate. In certain embodiments, between 5% and 15% by volume of the carbon nanotubes can be incorporated. In certain embodiments, between 15% and 25% by volume of the carbon nanotubes can be incorporated.

Generally, nanomaterials, including carbon nanotubes, have low to very low solubility, particularly in water. Thus, in some embodiments, additives and/or solvents can be added to increase the solubility of the carbon nanotubes.

Solutions of the carbon nanotubes can be prepared that include carbon nanotubes, a polymer and solubilization solvent. Exemplary polymers can include a poly(aryleneethynylene) polymer, a poly(ferrocenylaryleneethynylene) polymer, a poly(ferrocenylethynylene) polymer, or combinations thereof. As used herein, with respect to the preparation of the solutions of nanomaterials, the term "mixing" means that the carbon nanotubes and the solubilizing polymer are brought into contact with each other in the presence of a solvent. Mixing techniques can include vigorous shaking, or sonication for a period of time ranging from approximately 10 min. to approximately 3 hours. Optionally, the step of solubilizing the carbon nanotubes can include the pre-sonication of the carbon nanotubes in the solvent for a time ranging from approximately 30 min. to approximately 3 hours. Exemplary materials and solvents for solubilizing carbon nanotubes, and other nanomaterials, are disclosed in U.S. Pat. No. 7,296,576, which is incorporated herein by reference, in its entirety. In certain embodiments, the solvent for solubilizing carbon nanotubes is selected from halogenated organic solvents, including haloalkanes and haloaromatics.

In certain embodiments, the solubilizing solvent its selected such that the interaction between polymer and carbon nanotubes in solution can be described as noncovalent bonding, rather than covalent bonding. Therefore, because the interaction is non-covalent, the underlying electronic structure of the carbon nanotubes and its key attributes are not affected by presence or interaction with the solvent.

In certain preferred embodiments, the amount of polymer added to aid in solubilizing the carbon nanotubes is kept as low as possible. Similarly, the volume of added solvents is kept as low as possible. Preferably, solvents employed to aid in the solubility of the carbon nanotubes have a relatively high volatility.

A carbon nanotube solution or suspension can be applied to the substrate surface by any known means. In certain embodiments, the solution or suspension containing the carbon nanotubes is applied to the substrate surface by pouring the solution onto the substrate. In other embodiments, the solution or suspension are spray coated onto the surface of the substrate. In yet other embodiments, the solution or suspension are wash coated onto the substrate surface.

In certain embodiments, the carbon nanotube solution or suspension can be applied to the substrate surface as an aqueous solution. Exemplary aqueous solutions have a concentration of at least 0.1 mg/mL, preferably approximately 1 mg/mL. In certain embodiments, the carbon nanotubes are only slightly soluble in water, thus requiring the addition of a secondary component to improve the solubility. Exemplary solubilizing components have been previously discussed and are disclosed, for example, in U.S. Pat. No. 7,296,576, which is hereby incorporated by reference in its entirety.

In certain embodiments, to prevent the formation of carbon nanotube aggregates, low concentration solutions are preferred. In certain embodiments, multiple applications or layers of the carbon nanotube solution can be applied to the substrate surface. In the embodiments where multiple layers of the carbon nanotube solution are applied to the substrate, the carbon nanotube layer is allowed to dry completely prior to the application of a subsequent layer.

Figure 2:
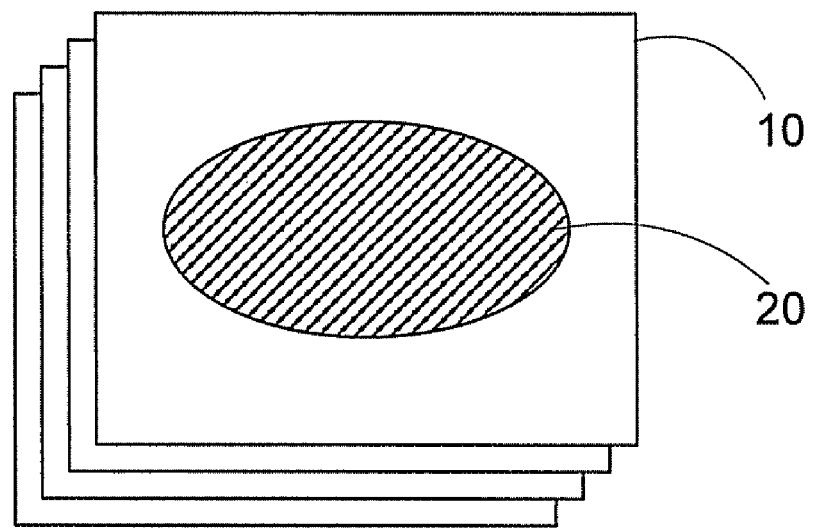
FIG. 2 is a schematic of a structure having multiple layers of carbon nanotubes on aluminum substrates.

As shown in FIG. 2, once the individual layers having carbon nanotube particles deposited on the metal substrate are prepared, multiple substrates can be combined to form a layered substrate having alternating layers of the metal substrate and the carbon nanotube layers. In this manner, layered substrates of any desired thickness can be prepared. In certain embodiments, layered substrates can be prepared having two or more different nanomaterials deposited on the substrates. For example, a layered substrate can be prepared that includes approximately 50% of substrates having carbon nanotubes deposited thereon, and approximately 50% of the substrates having boron nanotubes deposited thereon. Preferably, the plurality of individual substrates are combined and placed between two aluminum sheets, which are used as a top and bottom for the layered substrate, and having thicknesses that are substantially greater than the thickness of each individual layer. In certain embodiments, the edges of the layered substrate can be joined by welding, with an adhesive material, or the like. In certain embodiments, the layered substrate can be placed in a press or similar device to compress the individual layers into one discrete layered substrate.

Following the preparation of the layered substrate, a friction stir welding tool can used to mix all of the materials of the layered structure. In this process, the probe (or nib) of a friction stir welding tool traverses the entire surface area of the layered structure. This can be performed in an overlapping pattern to ensure that the entire layered structure is subjected to the friction stir welding process. In certain embodiments, the tool is automated to traverse the entire surface of the layered structure. In certain other embodiments, the tool can be automated to repeatedly traverse the entire surface of the layered structure.

In the process of using the friction stir welding tool to mix the constituent components, the depth of the probe is preferably maintained such that the integrity of the bottom of the layered structure is also maintained. Preferably, the depth of the pin of the friction stir welding tool is controlled such that the pin in retained within the structure, yet is deep enough to reach each discrete nanomaterial layers. One method for controlling the depth of a friction stir welding probe is described in U.S. Pat. No. 5,971,247, wherein the depth of the rotatable stir friction welding probe includes roller stops to control the depth of the probe, and is incorporated herein in its entirety.

During the preparation of composite materials according to an embodiment of a method described herein, the tool is rotated at a speed such that frictional heat generated by the tool is substantially below the melting point or the decomposition temperature of the materials. For example, the decomposition temperature of carbon nanotubes is approximately 900° C., and the melting point of aluminum is approximately 660° C. Thus, the temperature generated during the friction stir welding process for the preparation of a carbon nanotube-aluminum composite material is maintained below 650° C. Preferably, the temperature generated by the friction stir welding tool is between approximately 450° C. and approximately 600° C., more preferably between approximately 500° C. and approximately 550° C. By maintaining a processing temperature below both the melting point of aluminum and the decomposition temperature of carbon nanotubes, the materials can be maintained in the plastic region, without forming carbon-aluminum complexes, which may form if sufficient temperature is created to break the carbon-carbon bonds in the carbon nanotubes.

The friction stir welding process has been previously described, such as for example, as is found in U.S. Pat. No. 5,971,247 (Gentry; Lockheed Martin), U.S. Pat. No. 6,582,539 (Iwanczyk, et al.; Lockheed Martin), U.S. Pat. No. 5,813,592 (Midling, et al.; The Welding Institute), U.S. Pat. No. 5,794,835 (Colligan, et al.; Boeing), U.S. Pat. No. 5,460,317 (Thomas, et al.; The Welding Institute), and U.S. Pat. No. 6,543,671 (Hatten, et al.; Lockheed Martin), each of which is hereby incorporated by reference in their entirety.

Various advantages result from the use of such a friction stir welding process where at least two materials are intimately mixed in their solid or plastic state, and at temperatures below the melting points of the materials being mixed. As applied to the present invention, these advantages include continuous dispersal of the aluminum and carbon nanotubes, random distribution of the carbon nanotubes throughout the resulting composite, and low distortion of the work piece (due in part to the low heat transferred to the work piece during the friction stir welding process). The random distribution of the carbon nanotubes throughout the structure leads to a cohesive three-dimensional structure, rather than a two-dimensional layered laminate structure. Additionally, because the materials are plasticized rather than melted, there are numerous positions in which the work piece can be worked on as the friction stir welding device can be positioned work around the work pieces. Finally, because the temperatures generated during the friction stir welding process are maintained below the melting point of the materials, the creation of intermetallic or other "bonded" compounds is limited or preferably completely eliminated.

As with any welding process, the friction stir welding process can result in anomalies in the surface being welded, including circular voids, surface and subsurface longitudinal voids and in-process exit holes. Anomalies resulting from the friction stir process can be repaired by known means, as described in U.S. Pat. No. 5,971,252, which is hereby incorporated by reference in its entirety. While the methods in the above noted patent are directed to the repair of aluminum alloys, it is understood that the methods described can be applied to a variety of different metals, alloys and composite materials.

While the present invention has been described with respect to organic nanomaterials, one of skill in the art recognizes that the techniques described herein can also be applied to inorganic nanoparticles. Inorganic nanomaterials have gained interest in recent years for their electrical, optical and chemical properties. Exemplary inorganic nanoparticles can include, for example, metals, semiconductors, metal oxides, and the like.

EXAMPLE

A water-based suspension of carbon nanotubes having a carbon nanotube concentration of approximately 1 mg/mL is obtained from Zyvex Corporation (Richardson, Tex.) and used as received.

Aluminum alloy 3003 foil sheets were obtained from a commercial supplier, having dimensions of approximately 8 by 8 and a thickness of approximately 0.03 inches are cleaned with alcohol and dried prior to use.

Approximately 5 mL of the carbon nanotube suspension is poured onto the surface of the aluminum foil. The foil is then heated at a temperature of approximately 100° C. for approximately 4 hours to increase the rate of evaporation of the water and deposition of the carbon nanotubes on the foil surface. A resulting carbon nanotube layer having a thickness of approximately 0.0003 is deposited on the surface of the aluminum foil.

A composite structure is prepared by stacking one hundred (100) foil sheets having the carbon nanotube layer deposited thereon. A 3003 alloy aluminum foil sheet having like dimensions and a thickness of approximately 0.10 inches is positioned as both the top and bottom layer of the structure. The structure is clamped together and the perimeter welded under vacuum using an electron beam.

The structure is then treated with a MTS friction stir welding device to provide a resulting composite substrate having a random distribution of carbon nanotubes and aluminum.

As used herein, the terms about and approximately should be interpreted to include any values which are within 5% of the recited value. Furthermore, recitation of the term about and approximately with respect to a range of values should be interpreted to include both the upper and lower end of the recited range.

As used in the specification and claims, the singular form "a", "an" and "the" may include plural references, unless the context clearly dictates the singular form.

Although some embodiments of the present invention have been described in detail, it should be understood that various changes, substitutions, and alterations can be made hereupon without departing from the principle and scope of the invention.

That claimed is:

1. A method for the preparation of composite material comprising nanomaterials, the method comprising the steps of:
   providing a plurality of metal layers and a plurality of nanomaterial layers, wherein each metal layer comprises one of the nanomaterial layers deposited on the surface of the metal layer;
   stacking the metal layers on each other to create layered structure with the nanomaterial layers alternating with the metal layers; and
   applying a friction stir welding tool to a surface of the layered structure to generate heat to mix the nanomaterial layers and the metal layers of the layered structure and produce a composite structure having nanomaterials integrated therein.

2. The method of claim 1 wherein the step of applying the friction stir welding tool to the surface comprises penetrating the layered structure with a probe of material harder than the metal of the metal layers and the nanomaterial of the nanomaterial layers and rotating the probe to generate a frictional heat, said frictional heat creating a plasticized state of the metal and the nanomaterial, said rotation of the probe causing the flow of the metal and the nanomaterial about the probe, allowing the metal and the nanomaterial to solidify behind the probe.

3. The method of claim 2 wherein the probe penetrates sufficiently into the layered structure to contact all of the nanomaterial layers.

4. The method of claim 1 wherein the metal layers comprise aluminum or an aluminum alloy.

5. The method of claim 1 wherein stacking the metal layers further comprises welding perimeters of the metal layers together prior to applying the friction stir welding tool to the surface of the layered structure.

6. The method of claim 1 wherein the nanomaterial layer comprises boron nanotubes.

7. The method of claim 1 wherein each of the nanomaterial layers is prepared by depositing a nanomaterial solution on the surface of each of the metal layers and evaporating a solvent from the surface of each of the metal layers.

8. The method of claim 1 wherein each of the metal layers has a thickness of between about 0.001 and about 0.05 inches.

9. The method of claim 1 wherein the nanomaterial layers are deposited on the metal layers by chemical vapor deposition.

10. The method of claim 1 wherein stacking the metal layers further comprises providing the layered structure with a top metal layer and a bottom metal layer, the top metal layer and the bottom metal layer being free of nanomaterial deposits thereon and being thicker than the metal layers sandwiched between.

11. The method of claim 10, further comprising welding perimeters of the metal layers and the top and the bottom metal layers together prior to applying the friction stir welding tool to the surface of the layered structure.

12. The method of claim 11 wherein the applying the friction stir welding tool to a surface comprises applying the friction stir welding tool to one of the top and the bottom metal layers.

13. A method for the preparation of an aluminum-carbon nanotube composite structure, the method comprising the steps of:

providing a plurality of aluminum substrates, said aluminum substrates having a thickness of between about 0.002 and about 0.01 inches;

depositing a plurality of carbon nanotube layers on the aluminum substrates, wherein said carbon nanotube layers are applied to the aluminum substrates as a solution, said solution comprising carbon nanotubes and a solubilizing solvent;

removing the solubilizing solvent from the carbon nanotube layers on the aluminum substrates;

stacking the plurality of aluminum substrates having the carbon nanotube layers deposited thereon on top of each other to produce a layered structure having alternating layers of aluminum substrates and carbon nanotube layers; and applying a friction stir welding tool to a surface of the layered structure to heat the alternating layers of the layered structure to produce a composite material, said composite material comprising aluminum and carbon nanotubes integrally mixed.

14. The method of claim 13 wherein applying the friction stir welding tool to the surface comprises penetrating the layered structure with a rotating probe to a depth sufficient to reach all of the carbon nanotube layers.

15. The method of claim 13 wherein stacking the plurality of aluminum substrates further comprises providing the layered structure with top and bottom aluminum sheets, the top and the bottom aluminum sheets being free of nanotube layers deposited thereon and being thicker than the aluminum substrates located between the top and the bottom aluminum sheets.

16. The method of claim 15 further comprising welding a perimeter of the layered structure prior to applying, the friction stir welding tool to the surface of the layered structure.

17. The method according to claim 15, wherein applying the friction stir welding tool to the surface comprises applying the friction stir welding tool to one of the top and bottom aluminum sheets.

* * * * *